United States Patent
Tuong The

(10) Patent No.: US 10,669,105 B2
(45) Date of Patent: Jun. 2, 2020

(54) MOLD CONVEYANCE ROLLER UNIT

(71) Applicant: Nichietsu Inc., Yokohama, Kanagawa (JP)

(72) Inventor: Hien Tuong The, Kanagawa (JP)

(73) Assignee: NICHIETSU INC., Kanagawa (JP)

(*) Notice: Subject to any disclaimer, the term of this patent is extended or adjusted under 35 U.S.C. 154(b) by 0 days.

(21) Appl. No.: 16/215,095

(22) Filed: Dec. 10, 2018

(65) Prior Publication Data

US 2020/0031587 A1 Jan. 30, 2020

(30) Foreign Application Priority Data

Jul. 30, 2018 (JP) .................. 2018-142156

(51) Int. Cl.
*B65G 39/14* (2006.01)
*B29C 45/17* (2006.01)
*B29C 33/34* (2006.01)

(52) U.S. Cl.
CPC .............. *B65G 39/14* (2013.01); *B29C 33/34* (2013.01); *B29C 45/1756* (2013.01); *B65G 2201/0223* (2013.01); *B65G 2207/48* (2013.01)

(58) Field of Classification Search
CPC ...... B65G 39/14; B29C 33/34; B29C 45/1756
See application file for complete search history.

(56) References Cited

U.S. PATENT DOCUMENTS

| 2,617,509 A | * | 11/1952 | Britton | ................... B21D 37/14 |
| | | | | 193/35 B |
| 4,834,558 A | * | 5/1989 | Morse | ................... B30B 15/028 |
| | | | | 100/918 |

FOREIGN PATENT DOCUMENTS

| JP | 46-032174 Y | 11/1971 |
| JP | 54-121919 U1 | 8/1979 |
| JP | 57-160621 A | 10/1982 |
| JP | 58-2537 Y2 | 1/1983 |
| JP | 01-275313 A | 11/1989 |
| JP | 2-038170 U1 | 3/1990 |
| JP | 9-066543 | 3/1997 |

* cited by examiner

Primary Examiner — William R Harp
(74) Attorney, Agent, or Firm — Hamre, Schumann, Mueller & Larson, P.C.

(57) ABSTRACT

A mold conveyance roller unit includes: a rotatable roller main body on which a mold is to be placed; a roller support member that rotatably supports the roller main body; a base member to which the roller support member is attached together with the roller main body in a manner capable of vertical motion; and a resilient member that is fitted between the base member and the roller support member to elastically press the roller support member toward above the base member.

19 Claims, 21 Drawing Sheets

MOLD CONVEYANCE ROLLER UNIT

FIELD

The present invention relates to a mold conveyance roller unit that, at the time of mold changing in a horizontal injection molding machine, conveys the mold while supporting the lower surface of the mold.

BACKGROUND

Due to diversified needs in recent years, there has been increasing demand for low-volume high-variety production by injection molding, and the frequency of change in a mold used in an injection molding machine tends to increase.

Molds need to be accurately fixed to the injection molding machine even they are heavy in weight. Accordingly, the fixation of molds is time-consuming work for even skilled workers.

To facilitate mold changing, Patent Document 1 discloses a method in which a mold change device is provided on a side surface of a horizontal injection molding machine.

Patent document 1: JP H9-66543 A

According to Patent Document 1, a large number of rollers is installed to place a mold on the mold attachment surfaces of the mold change device and the molding machine so that the mold is can be conveyed by the rotation of the rollers.

Molds of various sizes are used in the same molding machine, and they may have a larger weight difference three times or more in some cases.

In a horizontal injection molding machine, it is necessary to align the position of a nozzle touch portion of the mold with the position of an injection nozzle of the injection molding machine. Accordingly, the vertical position of the mold needs to be kept within a certain range regardless of the weight of the mold.

Therefore, according to the conventional technique disclosed in Patent Document 1, the rollers are rotatably fixed in predetermined positions.

SUMMARY

Incidentally, depending on the attachment accuracy of the rollers and the positional relationship between the mold change device with the rollers and the horizontal injection molding machine, there may occur a slight difference in height among the mold placement portions of the rollers.

Even if the height difference is minute, most of weight of the mold is put on the higher rollers. Accordingly, during the conveyance of the mold, these rollers may be subjected to an impact and broken at slide portions so that they become incapable of rotation.

This problem conspicuously occurs when the conveyance speed or conveyance frequency of the mold is increased.

For example, in a general mold change device, the maximum mold conveyance speed is about 300 mm per second and the maximum mold changing frequency is about ten times a day.

In contrast, for example, under the conditions that the mold conveyance speed is 1000 mm per second and the mold changing frequency is 5000 times a day, the slide portions of some of the rollers would become broken and incapable of rotation in a very short period of time such as several hours or several days.

To use the rollers under above mentioned conditions, the rollers may be increased in number or size. However, these measures would be difficult to implement due to not only cost increase but space limitations.

In particular, the horizontal injection molding machine has a mold attachment surface with tie bars and mold fixing devices in many cases, and thus only a small number of rollers can be installed there. Therefore, the rollers on the mold attachment surface tend to become broken at a higher frequency.

In light of the foregoing problems of the conventional technique, an object of the present invention is to provide a mold conveyance roller unit that achieves cost reduction and suppresses a large load on some of mold conveyance rollers to extend service life of the mold conveyance rollers.

A mold conveyance roller unit of the present invention includes: a rotatable roller main body that is used in a horizontal injection molding machine and a mold change device provided with the horizontal injection molding machine and on which a mold is to be placed; a roller support member that rotatably supports the roller main body; a base member to which the roller support member is attached together with the roller main body in a manner capable of vertical motion; and a resilient member that is fitted between the base member and the roller support member to elastically press the roller support member toward above the base member.

According to this configuration, the mold is placed on the roller main body and conveyed by the rotation of the roller main body.

During the conveyance of the mold, in the case where the roller main body located anteriorly in a conveyance direction is situated above the lower surface of the mold, when the mold contacts the roller main body situated above, the roller main body descends together with the roller support member while compressing the resilient member.

The roller main body is subjected to a force of the same degree as the resilient force generated by the resilient member. However, this force is significantly smaller than the impulsive force generated in a state in which the roller main body is fixed, and thus the service life of the roller main body can be extended.

Accordingly, the roller main body with small rated load can be selected, thereby achieving reduction in the cost of manufacturing the mold conveyance roller unit.

In addition, each mold conveyance roller units held as it bears the weight of the mold, which makes it possible to decrease the number of the mold conveyance roller units.

Specifically, for example, during the conveyance of the mold, each of two attachment plates of the mold only has configuration to be constantly supported by three mold conveyance roller units.

Above mentioned configuration creates a space between the adjacent mold conveyance roller units. This space can be effectively used to place the mold on the mold conveyance roller units by equipment such as a folk lift.

The mold conveyance roller unit can be configured such that the roller support member is supported in a manner capable of vertically swinging by a shaft that is provided in the base member and has an axis line parallel to a rotation axis line of the roller main body, the resilient member is interposed between a swing-side end portion and the base member, and the roller main body is rotatably attached to the middle of the roller support member.

Positioning the roller main body between the resilient member and the shaft as described above makes it possible to decrease the resilient force of the resilient member based on the principle of leverage, when the support force applied to the roller main body is constant.

By this action, even when the mold is heavy in weight, the mold can be supported by the resilient member having a small resilient modulus such as spring modulus to achieve cost reduction.

The resilient member may be used in such a manner as to generate resilient force by compression or by extension.

The mold conveyance roller unit can be configured such that the base member is provided with a swing arm that is swingably supported by a second shaft having an axis line parallel to the rotation axis line of the roller main body, the roller support member is swingably attached to the swing arm via a third shaft, and a resilient member is provided between the swing arm and the roller support member and between the swing arm and the base member to elastically press the swing arm and the roller support member toward above the base member.

According to this configuration, when the mold is moved onto the roller main body, the roller support member swings downward while elastically deforming the resilient member which is installed between the swing arm and the roller support member.

Accordingly, the roller main body smoothly descends to the lower part of the mold to decrease a load on the roller main body.

In addition, even when there is a slight height difference among the large number of roller main bodies, these roller main bodies smoothly enter into the lower surface of the mold so that the weight of the mold is evenly borne by the roller main bodies.

In case when the mold vibrates during the movement, the vibration is absorbed by the elastic deformation of the resilient member between the swing arm and the base member.

This action prevents an overload on the roller main body and achieves the long service life of the roller main body.

The base member is preferably provided with a stopper portion that engages with the roller support member to restrict the descent position of the roller support member.

According to this configuration, it is possible to restrict the lowest descent position of the roller main body and prevent the mold from being significantly displaced from the fixed position.

It is preferred to provide a pre-load mechanism that applies a predetermined resilient force to the resilient member in advance.

According to this configuration, it is possible to support the mold while minimizing the amount of descent of the roller main body by contact with the mold.

In this case, setting the resilient force to be applied in advance to the resilient member depending on the weight of the mold makes it possible to prevent the vertical positional shift of the mold and fix the mold to the injection molding machine with high accuracy.

The roller main body can be connected to a drive unit that rotates the roller main body.

Above mentioned configuration makes it possible to rotate the roller main body by the drive unit to automatically convey the mold on the roller main body.

According to the present invention, it is possible to provide a mold conveyance roller unit that is compact in size, has a longer service life, and achieves cost reduction.

DRAWINGS

FIG. 1A is a plan view and FIG. 1B is an enlarged view of a fixed platen as seen from inside;

DETAILED DESCRIPTION

Figure 1A:
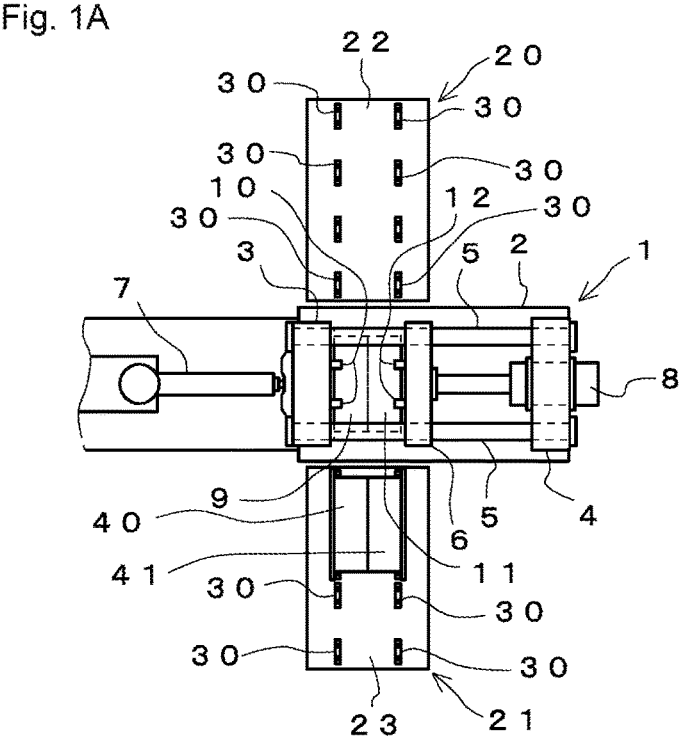
FIGS. 1A and 1B illustrate a procedure for mold change in a horizontal injection molding machine by a mold change device to which a first embodiment of a mold conveyance roller unit in the present invention is applied.

A first embodiment of the present invention will be described with reference to the drawings.

First, descriptions will be given as to a configuration of a horizontal injection molding machine including a mold change device to which the first embodiment of the present invention is applied, and a procedure for mold changing in the horizontal injection molding machine with reference to FIG. 1 to FIG. 4.

In these drawings, reference sign 1 represents the horizontal injection molding machine.

The horizontal injection molding machine 1 includes: a base 2; a pair of parallel fixed platens 3 and 4 that is fixed and bonded to the base 2 with spacing therebetween; four tie bars 5 that are integrally installed between the fixed platens 3 and 4 (only the two tie bars arranged on the upper side are illustrated in the drawings); a movable platen 6 that is slidably attached to the tie bars 5 between both the fixed platens 3 and 4; an injection cylinder 7 that is provided on the one fixed platen 3 side to inject a molding resin; and a clamping device 8 that is attached to the other fixed platen 4 to press the movable platen 6 toward the one fixed platen 3.

A fixed mold 9 is detachably fixed by clamps 10 to the surface of the one fixed platen 3 opposed to the movable platen 6 (mold attachment surface). A movable mold 11 is detachably fixed by clamps 12 to the surface of the movable platen 6 opposed to the one fixed platen 3 (mold attachment surface).

Mold change devices 20 and 21 are provided on both sides of the horizontal injection molding machine 1 where is facing positions between the one fixed platen 3. The mold change devices 20 and 21 are provided to perform mold changing of the fixed mold 9 and the movable mold 11.

The mold change devices 20 and 21 include bases 22 and 23 almost orthogonal to the base 2 of the horizontal injection molding machine 1. Further, large number of mold conveyance roller units 30 according to the present embodiment is attached to the upper surfaces of the bases 22 and 23.

The large number of mold conveyance roller units 30 is arranged such that the conveyance direction is orthogonal to the tie bars 5 and is mounted in two rows on the bases 22 and 23 with spacing therebetween along the length of the tie bars 5.

Figure 1B:
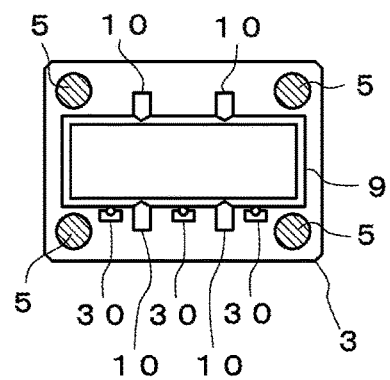
Figure 3:
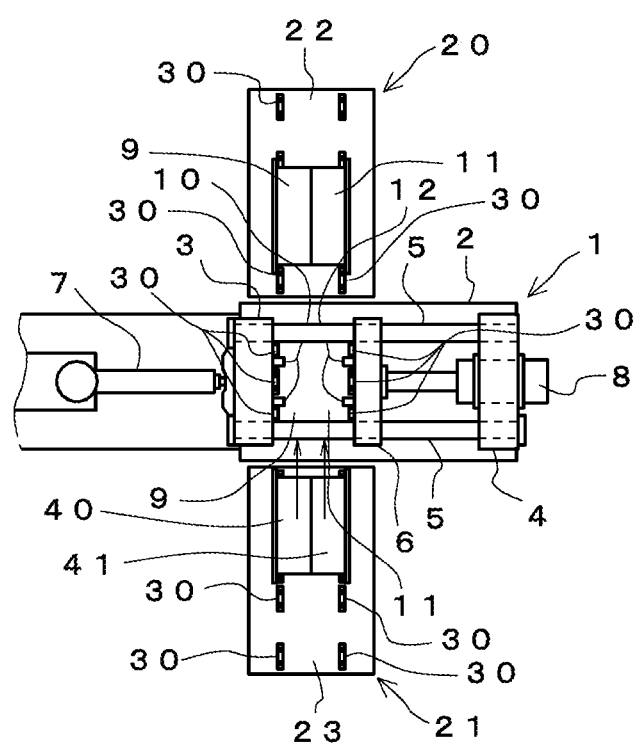
FIG. 3 is a plan view illustrating a procedure for mold changing in the horizontal injection molding machine by the mold change device to which the first embodiment of the mold conveyance roller unit in the present invention is applied.
Figure 4:
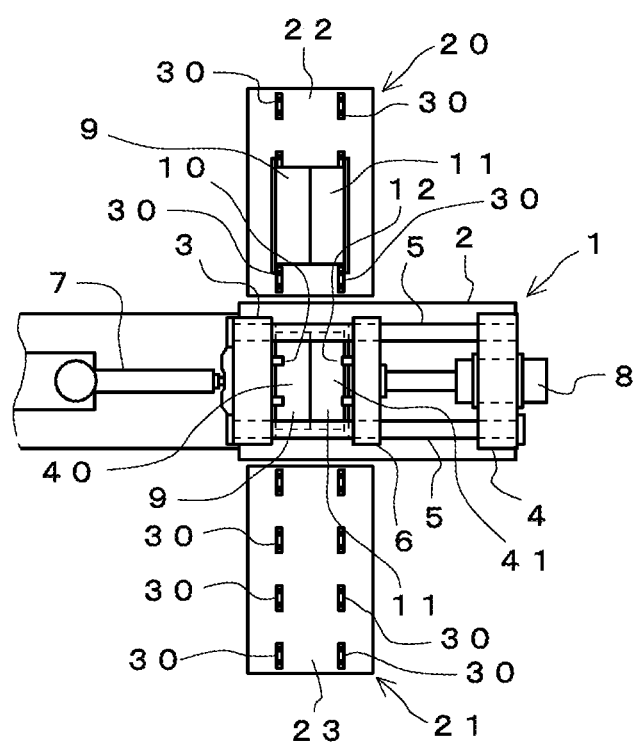
FIG. 4 is a plan view illustrating a procedure for mold changing in the horizontal injection molding machine by the mold change device to which the first embodiment of the mold conveyance roller unit in the present invention is applied.

In addition, the mold conveyance roller units 30 are installed on mold attachment surfaces of the one fixed platen 3 and the movable platen 6 as shown in FIG. 1B and FIG. 3.

Next, the mold conveyance roller unit 30 according to the present embodiment will be described with reference to FIG. 5.

The mold conveyance roller unit 30 in the present embodiment includes: a rotatable roller main body 31 on which the fixed mold 9 and the movable mold 11 are placed; a roller support member 32 that rotatably supports the roller main body 31; a base member 33 to which the roller support member 32 is attached together with the roller main body 31 in a manner capable of vertical motion; and a resilient member 34 that is installed between the base member 33 and the roller support member 32 to resiliently press the roller support member 32 toward above the base member 33.

The roller main body 31 is rotatably attached to the roller support member 32 via components such as a needle bearing illustrated in the drawings.

The roller support member 32 has the lower end portion which is formed rectangular in outer shape. The resilient member 34 is interposed between the lower end surface of the roller support member 32 and the base member 33.

A fixing bolt 35 vertically penetrates the base member 33, and is inserted into the resilient member 34 and screwed into the roller support member 32.

The base member 33, the resilient member 34, and the roller support member 32 are assembled by the fixing bolt 35.

Moreover, the base member 33 includes a base portion 33a that is a connected portion formed thereunder and coupled to the mold change devices 20 and 21, a pair of parallel guide portions 33b that is protruded from the upper side of the base portion 33a to sandwich the roller support member 32 therebetween, and descent position restriction portions 33c that are protruded upward between these guide portions 33b.

The pair of guide portions 33b has the inner surface facing the outer surface of the rectangular lower end portion of the roller support member 32.

This suppresses the rotation of the rotation axis line of the roller main body 31 around the axis line of the fixing bolt 35.

That is, this suppresses displacement of the roller main body 31 in the conveyance direction.

The descent position restriction portions 33c are configured such that, when the roller support member 32 descends together with the roller main body 31, the roller support member 32 is brought into abutment with the descent position restriction portions 33c to suppress the descent.

Accordingly, the sink position of the roller main body 31 in the base member 33 is restricted.

In other words, the lowest descent positions of the fixed mold 9 and the movable mold 11 placed on the roller main body 31 are restricted.

The mold conveyance roller units 30 in the present embodiment configured in this way are installed in series in two rows on the mold change devices 20 and 21 such that the conveyance direction is orthogonal to the length of the tie bars 5 and with spacing therebetween along the length of the tie bars 5.

In addition, the mold conveyance roller units 30 are attached to the mold attachment surfaces of the one fixed platen 3 and the movable platen 6.

Next, a method for mold changing by the aforementioned mold change devices 20 and 21 will be described with reference to FIG. 1 through FIG. 4.

First, while the fixed mold 9 and the movable mold 11 are closed by the clamping device 8, the fixed platen 3 and the movable platen 6 are disengaged from each other and the fixed mold 9 and the movable mold 11 are disengaged from each other.

Figure 2:
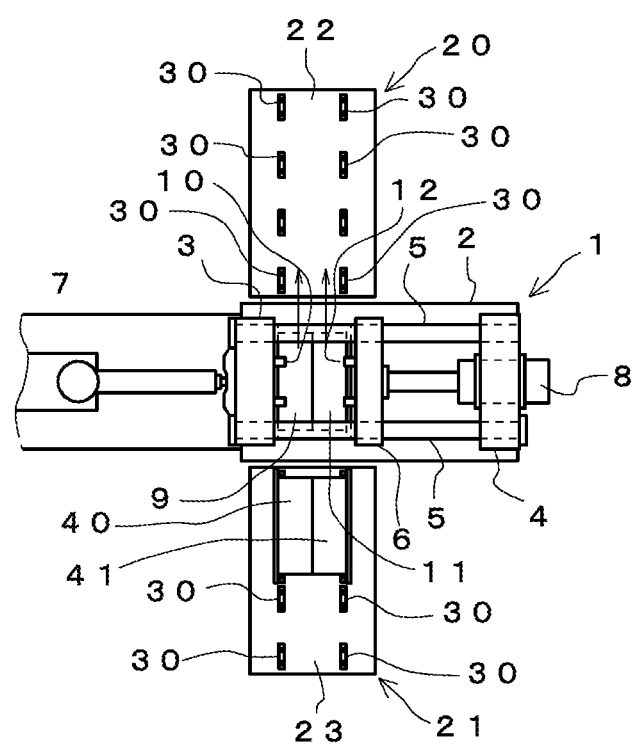
FIG. 2 is a plan view illustrating a procedure for mold changing in the horizontal injection molding machine by the mold change device to which the first embodiment of the mold conveyance roller unit in the present invention is applied.

In addition, the fixed mold 9 and the movable mold 11 disengaged from each other as described above are moved onto the one mold change device 20 as indicated by arrows in FIG. 2.

The fixed mold 9 and the are movable mold 11 moved onto the one mold change device 20 are then moved in sequence onto the plurality of mold conveyance roller units 30 arranged in series in two rows.

Figure 5:
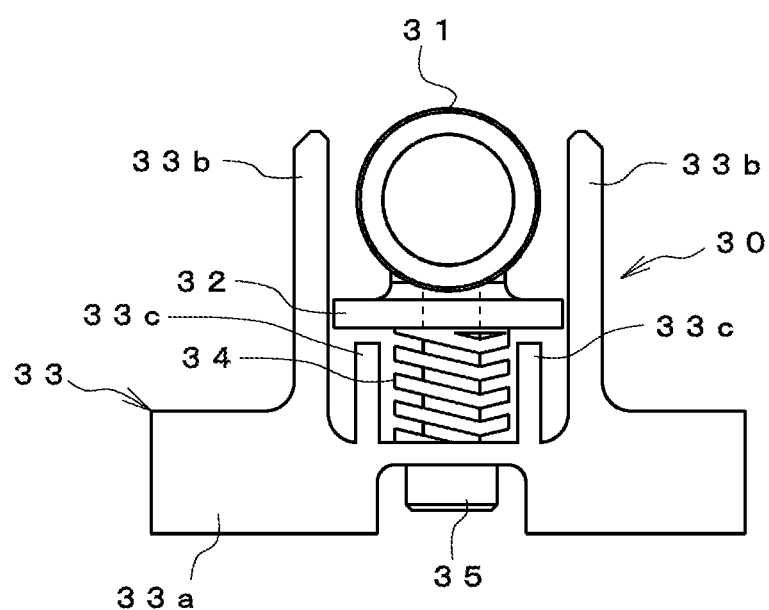
FIG. 5 is a front view of the first embodiment of the present invention.
Figure 6:
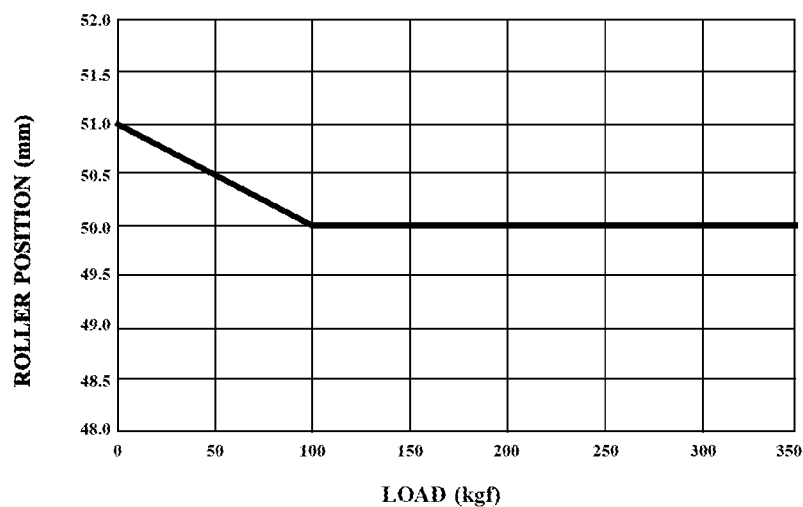
FIG. 6 is a roller main body position-load line diagram in the first embodiment of the present invention.

In this case, when the fixed mold 9 and the movable mold 11 are moved onto the mold conveyance roller unit 30, the roller main body 31 descends together with the base member 33 while compressing the resilient member 34 (see FIG. 5 and FIG. 6).

Accordingly, the roller main body 31 smoothly slides under the fixed mold 9 and the movable mold 11.

The motion of the roller main body 31 described above is produced in sequence on the large number of mold conveyance roller units 30 arranged in two rows, along with the movement of the fixed mold 9 and the movable mold 11.

Then, upon completion of the movement of the fixed mold 9 and the movable mold 11, their weights are borne by the large number of mold conveyance roller units 30 to complete the removal of the fixed mold 9 and the movable mold 11.

The descending action of the roller main body 31 described above lessens the impulsive force applied to the roller main body 31 and significantly suppresses damage to the bearing as a support portion of the roller main body 31.

As a result, it is possible to improve the durability of the mold conveyance roller units 30 or enable the use of low-strength and inexpensive members for cost reduction.

Then, another fixed mold 40 and another movable mold 41 placed in advance on the other mold change device 21 are moved and conveyed on the mold conveyance roller units 30 between the fixed platen 3 and the movable platen 6 after the removal of the fixed mold 9 and the movable mold 11 as illustrated by arrows in FIG. 3.

While being moved between the fixed platen 3 and the movable platen 6, the other fixed mold 40 and the other movable mold 41 are moved onto and supported by the mold conveyance roller units 30 attached to the mold attachment surfaces of the one fixed platen 3 and the movable platen 6.

Finally, the other fixed mold 40 and the other movable mold 41 conveyed between the fixed platen 3 and the movable platen 6 are fixed to the fixed platen 3 and the movable platen 6 by the clamps 10 and 12 to complete the change in the molds.

At aforementioned mold changing work, the discharge of the fixed mold 9 and the movable mold 11 and the introduction of the other fixed mold 40 and the other movable mold 41 may be performed at the same time.

At the time of conveyance of the other fixed mold 40 and the other movable mold 41, the operation of the roller main body 31 is performed in the same way.

Therefore, the same effects of durability improvement and cost reduction of the mold conveyance roller unit 30 can be obtained in the other mold change device 21 and the one fixed platen 3 and the movable platen 6.

On the other hand, the support force necessary for supporting the fixed molds 9 and 40 and the movable molds 11 and 41 can be obtained as the summation of resilient forces of the resilient members 34 in the large number of mold conveyance roller units 30 supporting these molds.

The resilient force of the resilient member 34 is determined by the descent distance of the roller main body 31, that is, the descent distance of the roller support member 32.

The descent position of the roller main body 31 has influence on the vertical relative positional relationships between the fixed molds 9 and 40 and the movable molds 11 and 41 and between the fixed platen 3 and the movable platen 6.

That is, the descent position of the roller main body 31 has influence on the positional relationship between the nozzle touch portion of the mold and the injection nozzle of the injection molding machine.

When the position of the nozzle touch portion of the mold and the position of the injection nozzle of the injection molding machine fall outside the permissible range, the injection of a resin into the mold becomes difficult.

To counter this problem, in the present embodiment, the roller support member 32 is brought into abutment with the descent position restriction portions 33c provided in the base member 33 to control the descent position of the roller support member 32, that is, the descent position of the roller main body 31 as illustrated in FIG. 5 and FIG. 6.

Accordingly, it is possible to fall the positional shift between the nozzle touch portion of the mold and the injection nozzle of the injection molding machine within the permissible range, and simplify the positioning of the mold at the time of mold changing.

Selecting the spring modulus of the resilient member 34 as appropriate makes it possible to adjust the resilient force of the resilient member 34 according to the weights of the fixed molds 9 and 40 and the movable molds 11 and 41.

Accordingly, it is possible to fall the amounts of descent of the roller main body 31 on the other mold change device 21, the one fixed platen 3, and the movable platen 6, that is, the amounts of descent of the fixed molds 9 and 40 and the movable molds 11 and 41 within the permissible range.

Next, a second embodiment of the present invention will be described with reference to FIG. 7 to FIG. 9.

A mold conveyance roller unit 50 in the present embodiment is configured such that the descent position restriction portions 33c provided in the base member 33 in the first embodiment described above are eliminated and a pre-load is applied by adjusting the amount of compression or extension of the resilient member 34 by the fixing bolt 35.

The same components as those of the first embodiment will be given the same reference signs as those of the first embodiment and descriptions thereof will be omitted.

Figure 7:
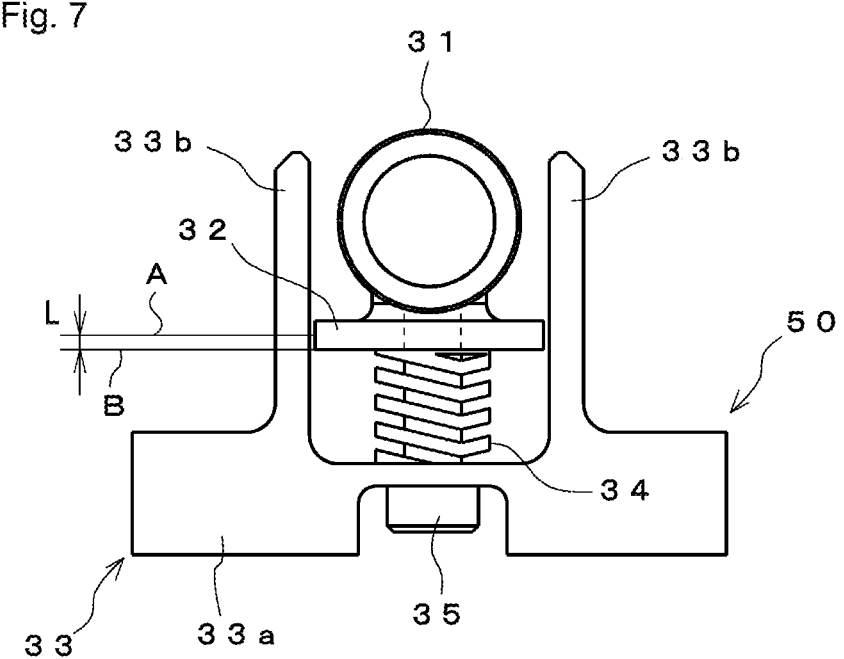
FIG. 7 is a front view of a second embodiment of the present invention.
Figure 8:
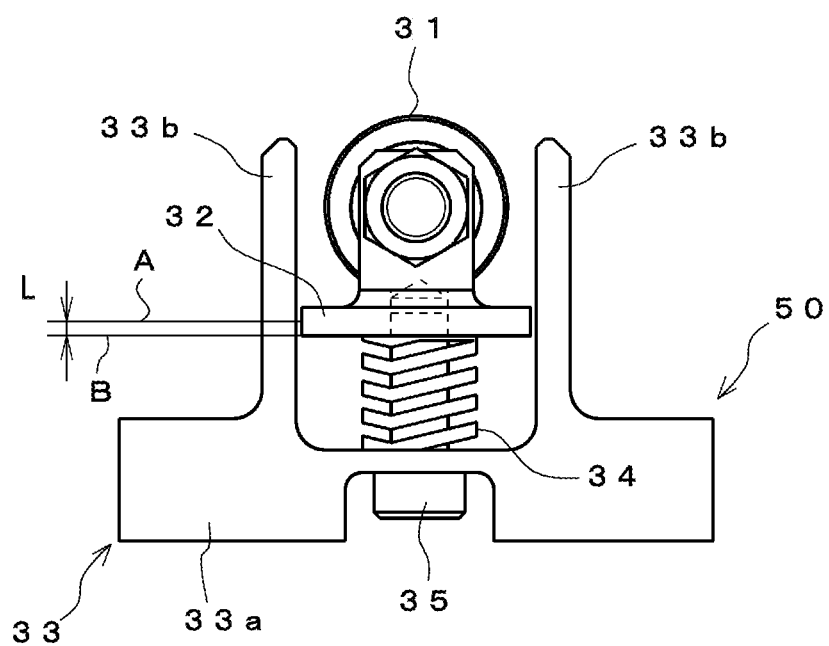
FIG. 8 is a rear view of the second embodiment of the present invention.

Specifically, as illustrated in FIG. 7, the position of the roller support member 32 relative to the base member 33 is initially set to a position B lowered by a predetermined distance L from a position A in the natural length of the resilient member 34 (the length without application of external force).

According to this configuration, the resilient force to be generated by the resilient member 34 compressed by the distance L can be set as a pre-load to the resilient member 34.

Figure 9:
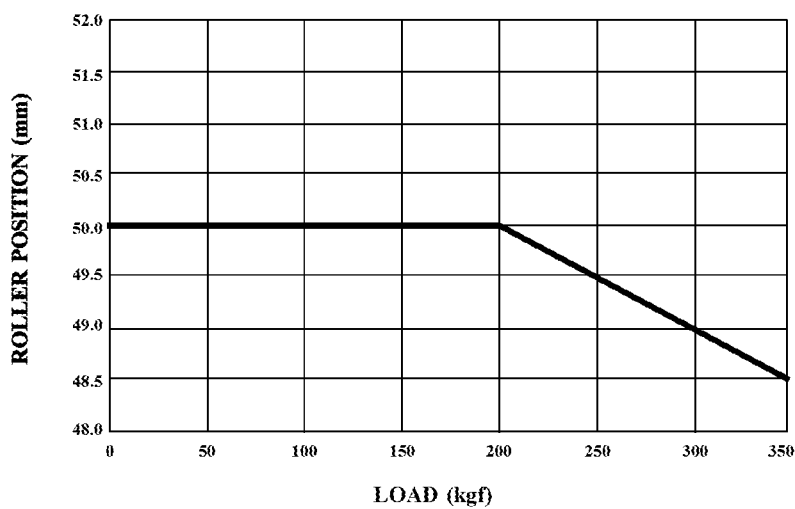
FIG. 9 is a roller main body position-load line diagram in the second embodiment of the present invention.

As illustrated in FIG. 9, when the pre-load is set to 200 kgf and the roller support member 32 is placed in the position B (50 mm in FIG. 9), the roller main body 31 will not descend under a load of 200 kgf or less on each of the roller main bodies 31.

Therefore, it is possible to prevent the vertical positional change of the mold conveyed by these mold conveyance roller units 50.

Introducing pre-load prevents the vertical positional shift between the fixed platen 3, the movable platen 6, and the mold at the time of mold changing and facilitates the work of mold changing.

To generate this pre-load, the opposed surfaces of the guide portions 33b may have step portions to hold the resilient member 34 in a state compressed in a predetermined length between the base portion 33a and the step portions.

Figure 10:
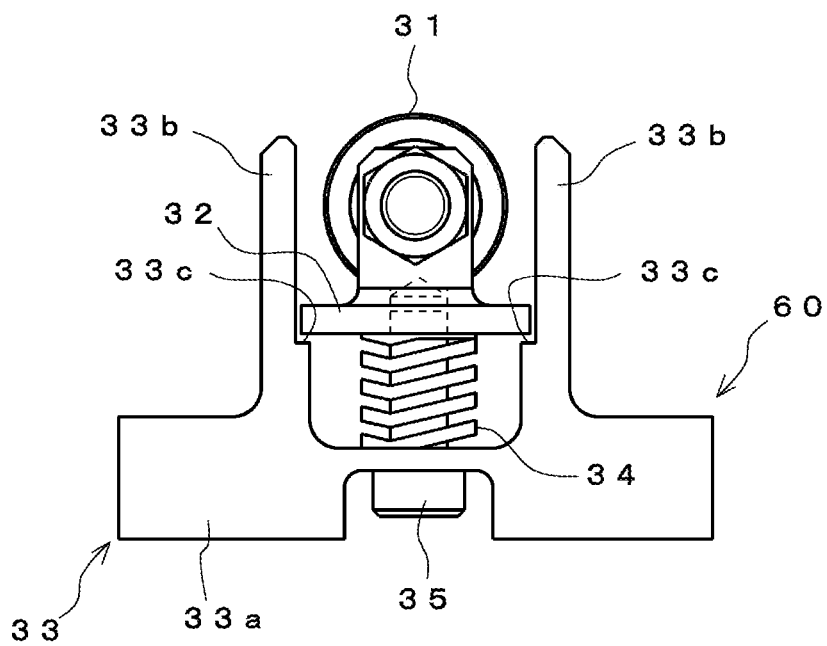
FIG. 10 is a front view of a third embodiment of the present invention.

FIG. 10 illustrates a third embodiment of the present invention. A mold conveyance roller unit 60 in the present embodiment is configured such that the descent position restriction portions 33c in the first embodiment are formed by step portions on the inner surface of the guide portion 33b.

In addition, the resilient member 34 is subjected to a pre-load.

The descent starting load of the roller main body 31 is set by this pre-load and the lowest descent position is restricted by the descent position restriction portions 33c.

According to this configuration, the descent position restriction portions 33c can be formed integrally with the guide portion 33b to simplify the structure.

Figure 11:
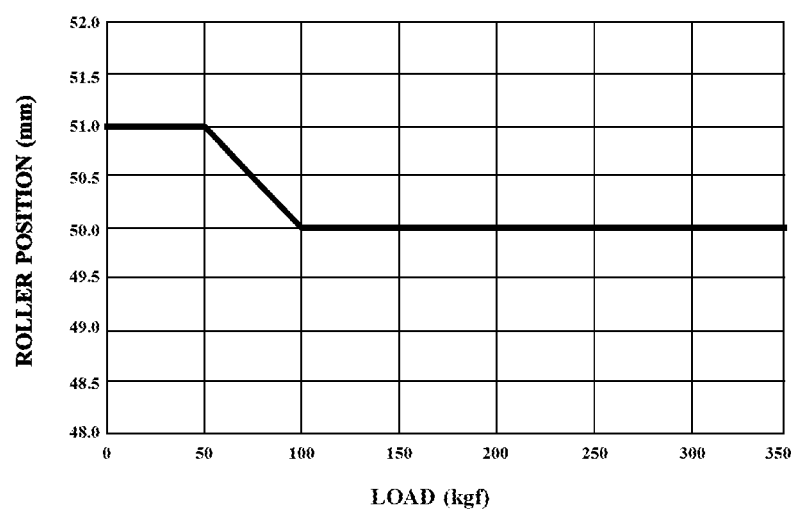
FIG. 11 is a roller main body position-load line diagram in the third embodiment of the present invention.
Figure 12:
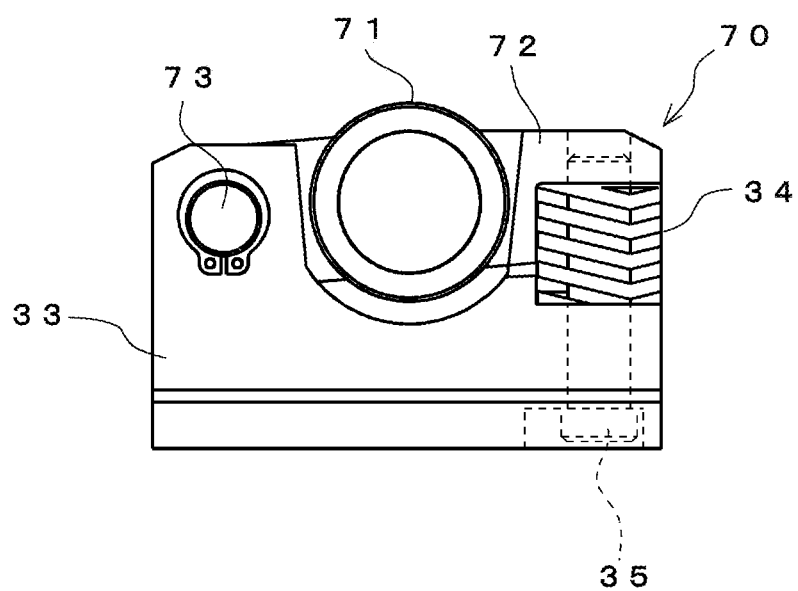
FIG. 12 is a front view of a fourth embodiment of the present invention.
Figure 13:
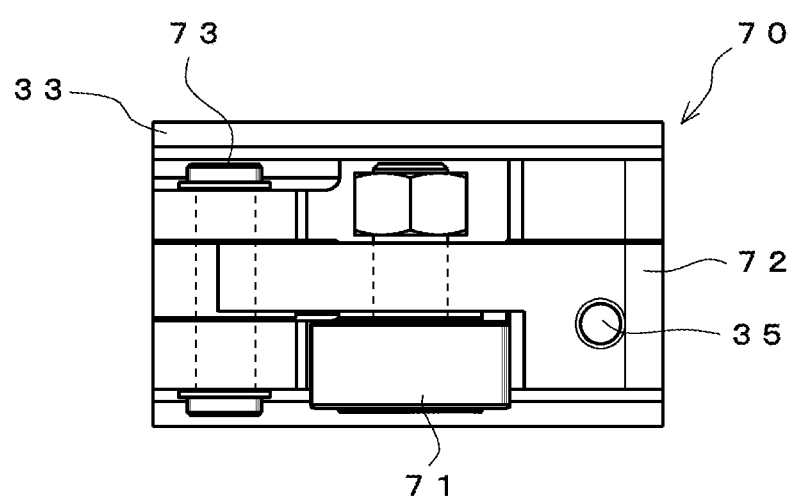
FIG. 13 is a plan view of the fourth embodiment of the present invention.
Figure 14:
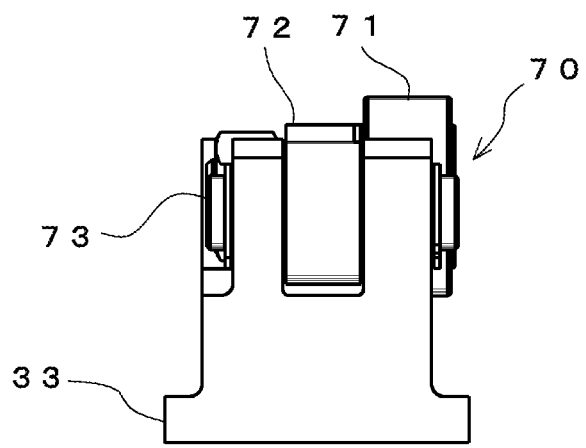
FIG. 14 is a left side view of the fourth embodiment of the present invention.

In the third embodiment as well, the same advantageous effects as those in the first embodiment can be obtained as illustrated in FIG. 11.

FIG. 12 to FIG. 15 illustrate a fourth embodiment of the present invention.

A mold conveyance roller unit with reference sign 70 in these drawings is configured such that a roller support member 72 supporting a roller main body 71 is provided in the base member 33 and supported by a shaft 73 with an axis line parallel to the rotation axis line of the roller main body 71, the resilient member 34 is interposed between the swing-side end portion of the roller support member 72 and the base member 33, and the roller main body 71 is rotatably attached to the middle of the roller support member 72.

In the fourth embodiment, the same fixing bolt 35 as that in the second embodiment is provided between the roller support member 72 and the base member 33 to apply a pre-load to the resilient member 34.

Figure 15:
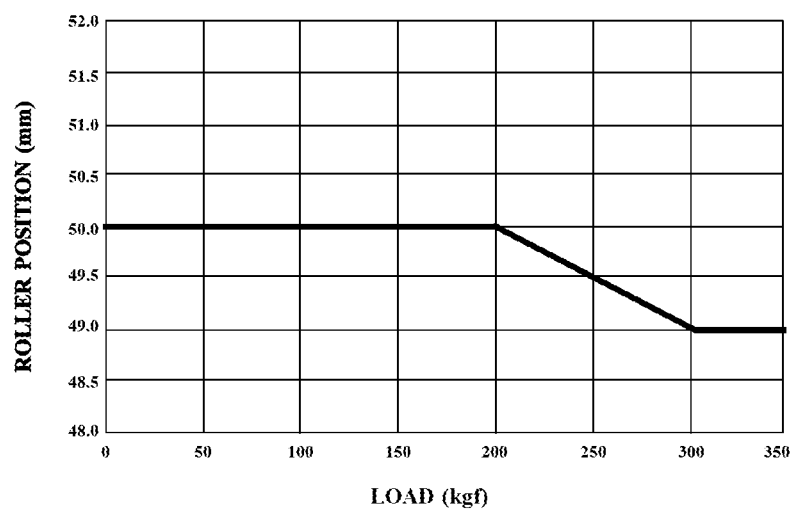
FIG. 15 is a roller main body position-load line diagram in the fourth embodiment of the present invention.
Figure 16:
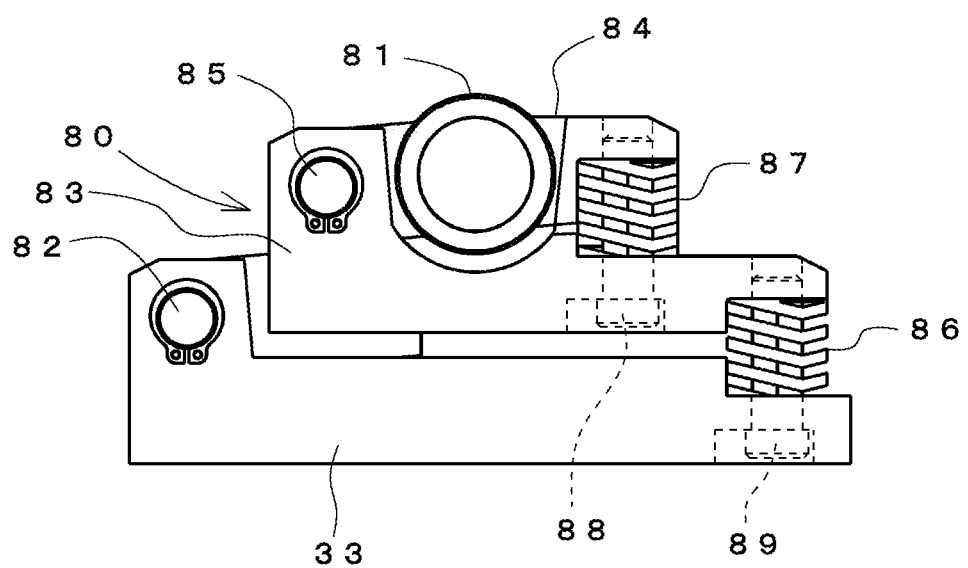
FIG. 16 is a front view of a fifth embodiment of the present invention.
Figure 17:
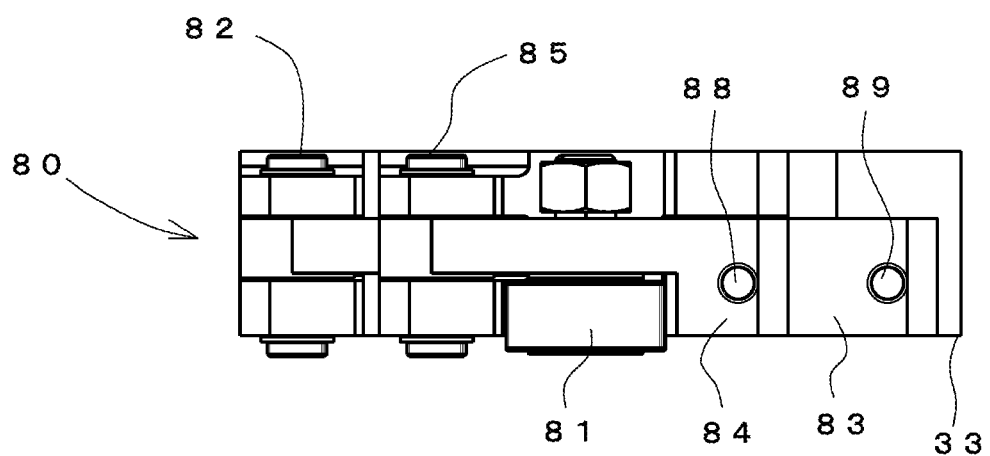
FIG. 17 is a plan view of the fifth embodiment of the present invention.
Figure 18:
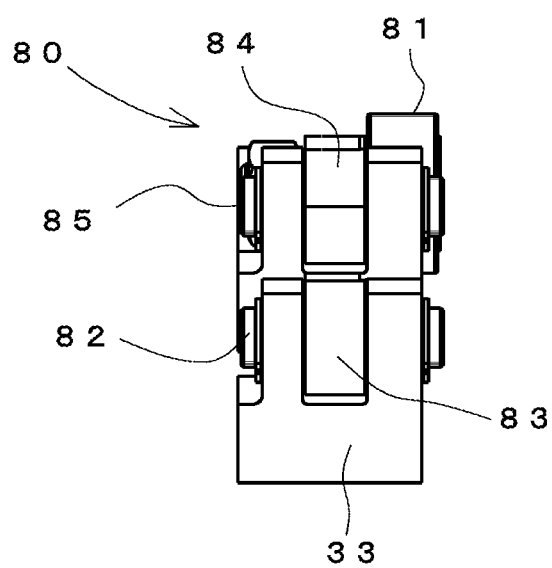
FIG. 18 is a left side view of the fifth embodiment of the present invention.

As illustrated in FIG. 15, when the pre-load is set to 200 kgf, the roller main body 71 will not descend under a load of 200 kgf or less on each of the roller main bodies 71.

Therefore, in the case where the load on one roller main body 71 is 200 kgf or less, even when there is a weight difference among the molds, there occurs no difference in the height position among the molds. Accordingly, it is possible to prevent the vertical positional change of the molds conveyed by these mold conveyance roller units 70.

Introducing pre-load prevents the vertical positional shift between the fixed platen 3, the movable platen 6, and the mold at the time of mold changing and facilitates the work of mold changing.

In the mold conveyance roller unit 70 of the present embodiment, the roller support member 72 constitutes a "leverage" in which the shaft 73 is the fulcrum, the swing end portion is the point of effort, and the roller main body 71 is the point of load.

According to this configuration, the force generated by the compression of the resilient member 34 is amplified at the position of the roller main body 71, which makes it possible to manufacture the high load-compatible mold conveyance roller unit in a compact size and at low cost.

FIG. 16 to FIG. 19 illustrate a fifth embodiment of the present invention.

A mold conveyance roller unit with reference sign 80 illustrated in these drawings is configured such that the base member 33 is provided with a swing arm 83 that is swingably supported by a second shaft 82 having an axis line parallel to the rotation axis line of a roller main body 81, a roller support member 84 to which the roller main body 81 is attached is swingably attached to the swing arm 83 via a third shaft 85, and resilient members 86 and 87 are provided between the swing arm 83 and the swing end portion of the roller support member 84 and between the swing end portion of the swing arm 83 and the base member 33 to resiliently press the swing arm 83 and the roller support member 84 toward above the base member 33.

Fixing bolts 88 and 89 are fastened between the swing arm 83 and the swing end portion of the roller support member 84 and between the swing end portion of the swing arm 83 and the base member 33 to apply a pre-load to the resilient members 86 and 87.

In the mold conveyance roller unit 80 in the present embodiment configured in this way, the resilient member 86 is larger in elastic modulus than the resilient member 87.

Figure 19:
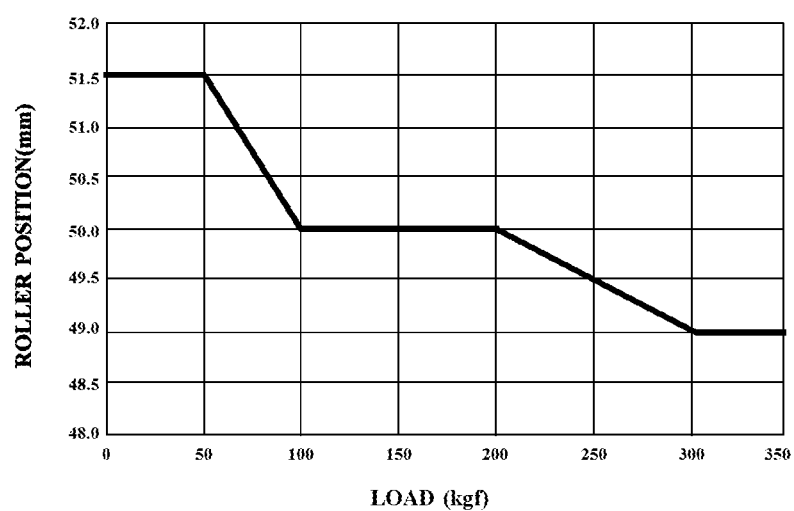
FIG. 19 is a roller main body position-load line diagram in the fifth embodiment of the present invention.

Accordingly, as illustrated in FIG. 19, the descent of the roller main body 81 at the time of conveyance of the mold is permitted by the swing of the roller support member 84 to prevent the application of an impulsive force to the roller main body 81.

In addition, the roller support member 84 is brought into abutment with the swing arm 83 by the descending action described above and then stops descending.

When the weight of the mold is applied to the roller main body 81, the weight acts on the swing arm 83 with which the roller support member 84 is in abutment, and is borne by the resilient force of the resilient member 86 interposed between the swing arm 83 and the base member 33.

The resilient member 86 falls the descent position of the roller main body 81 within a permissible range by its resilient force.

Figure 20:
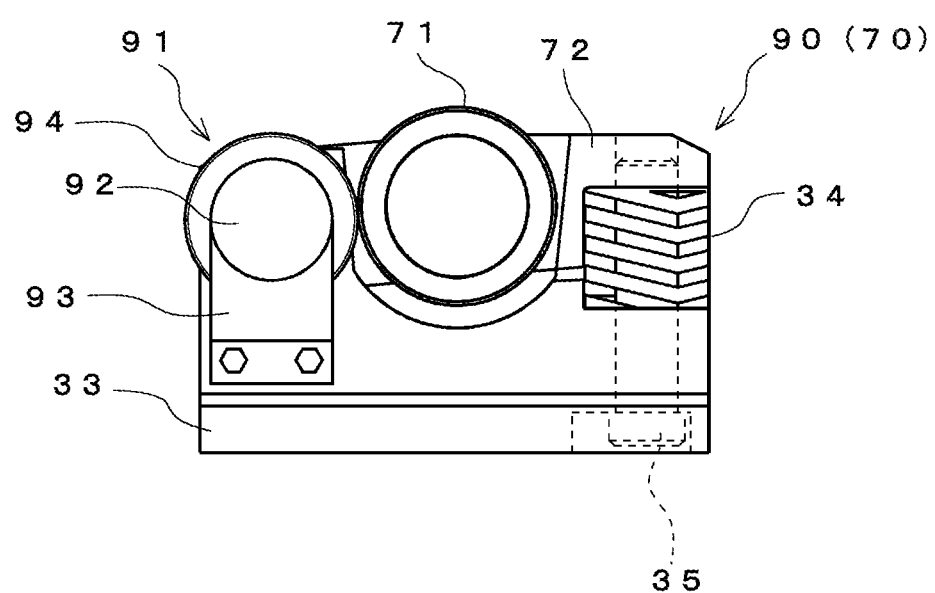
FIG. 20 is a front view of a sixth embodiment of the present invention.
Figure 21:
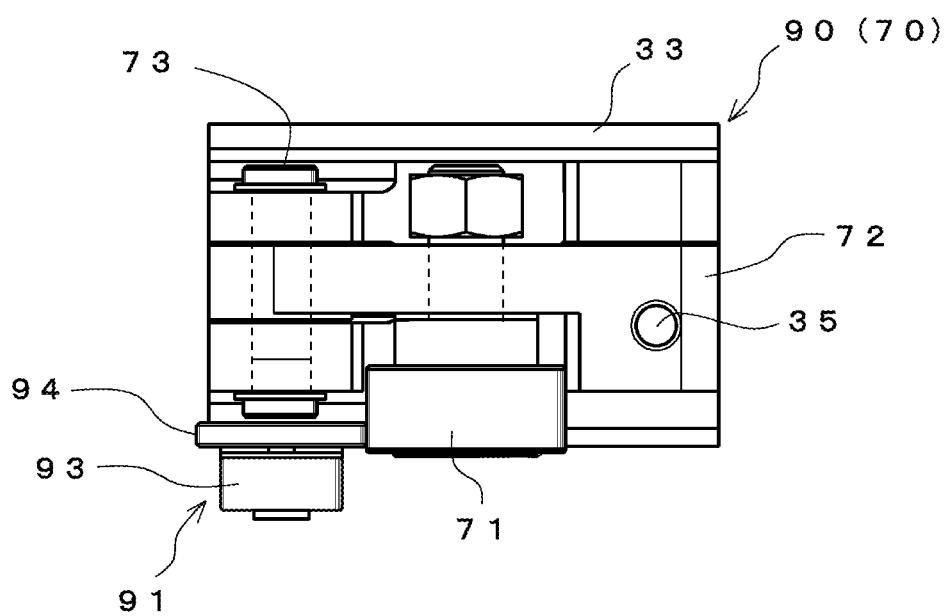
FIG. 21 is a plan view of the sixth embodiment of the present invention.

FIG. 20 and FIG. 21 illustrate a sixth embodiment of the present invention.

A mold conveyance roller unit with reference sign 90 in the present embodiment is provided with a drive unit 91 for automatic conveyance of molds.

These drawings illustrate an example in which the drive unit 91 is attached to the mold conveyance roller unit 70 in the fourth embodiment described above.

As illustrated in FIG. 21, a drive unit 91 is configured such that a motor 92 with a rotation axis coaxial to the shaft 73 is attached to the base member 33 via a stay 93 and a drive pulley 94 to be brought into abutment with the outer peripheral surface of the roller main body 71 is attached to the rotation shaft of the motor.

As the motor 92, a servo motor or a stepping motor can be preferably used, for example.

This is intended to facilitate synchronized rotation of the large number of roller main bodies 71 used for conveyance.

According to this configuration, the rotation of the motor 92 is transferred to the roller main body 71 via the drive pulley 94 so that the mold placed on the roller main body 71 can be conveyed by driving power.

The shapes, dimensions, and others of the components in the foregoing embodiments are mere examples and can be modified in various manners based on the design requirements and others.

For example, the drive unit 91 can be configured using an end-less power transfer band (for example, chain or belt) such that the end-less power transfer band is put on and in contact with all the plurality of roller main bodies 71 and is fitted over the motor.

1 horizontal injection molding machine
2, 22, 23 base
3, 4 fixed platen
5 tie bar
6 movable platen
7 injection cylinder
8 clamping device
9 fixed mold
10, 12 clamp
11, 41 movable mold
20, 21 mold change device
30, 50, 60, 70, 80, 90 mold conveyance roller unit
31, 71, 81 roller main body
32, 72, 84 roller support member
33 base member
33a base portion
33b guide portion
33c descent position restriction portion
34, 86, 87 resilient member
35, 88, 89 fixing bolt
73 shaft
82 second shaft
83 swing arm
85 third shaft
91 drive unit
92 motor
93 stay
94 drive pulley

The invention claimed is:
1. A mold conveyance roller unit used for movement of a mold between a horizontal injection molding machine and a mold change device provided at a side of the horizontal injection molding machine, the mold conveyance roller unit comprising:
- a rotatable roller main body on which the mold to be attached to and detached from the horizontal injection molding machine is to be placed;
- a roller support member that rotatably supports the roller main body;
- a base member to which the roller support member is attached together with the roller main body in a manner capable of vertical motion;
- a resilient member that is fitted between the base member and the roller support member to elastically press the roller support member in a direction away from the base member;
- the base member is fixed to the horizontal injection molding machine or to the mold change device; and
- a pre-load mechanism that applies a predetermined resilient force to the resilient member in advance, wherein the predetermined resilient force is equal to or greater than a weight added to the rotatable roller main body based on a weight of the mold.

2. The mold conveyance roller unit according to claim 1, wherein
- the roller support member is provided in the base member and is supported in a manner capable of vertically swinging by a shaft with an axis line parallel to a rotation axis line of the roller main body,
- the resilient member is interposed between a swing-side end portion of the roller support member and the base member, and
- the roller main body is rotatably attached to the middle of the roller support member.

3. The mold conveyance roller unit according to claim 2, wherein
- the base member is provided with a swing arm that is swingably supported by a second shaft having an axis line parallel to the rotation axis line of the roller main body,
- the roller support member is swingably attached to the swing arm via a third shaft, and
- the resilient member is provided between the swing arm and the roller support member and between the swing arm and the base member to elastically press the swing arm and the roller support member toward above the base member.

4. The mold conveyance roller unit according to claim 3, wherein the base member is provided with a stopper portion that is engaged with the roller support member to restrict a descent position of the roller support member.

5. The mold conveyance roller unit according to claim 3, wherein a drive unit is provided in the roller main body to rotate the roller main body.

6. The mold conveyance roller unit according to claim 2, wherein the base member is provided with a stopper portion that is engaged with the roller support member to restrict a descent position of the roller support member.

7. The mold conveyance roller unit according to claim 6, wherein a drive unit is provided in the roller main body to rotate the roller main body.

8. The mold conveyance roller unit according to claim 2, wherein a drive unit is provided in the roller main body to rotate the roller main body.

9. The mold conveyance roller unit according to claim 1, wherein
- the base member is provided with a swing arm that is swingably supported by a second shaft having an axis line parallel to the rotation axis line of the roller main body,
- the roller support member is swingably attached to the swing arm via a third shaft, and
- the resilient member is provided between the swing arm and the roller support member and between the swing arm and the base member to elastically press the swing arm and the roller support member toward above the base member.

10. The mold conveyance roller unit according to claim 9, wherein the base member is provided with a stopper portion that is engaged with the roller support member to restrict a descent position of the roller support member.

11. The mold conveyance roller unit according to claim 9, wherein a drive unit is provided in the roller main body to rotate the roller main body.

12. The mold conveyance roller unit according to claim 1, wherein the base member is provided with a stopper portion that is engaged with the roller support member to restrict a descent position of the roller support member.

13. The mold conveyance roller unit according to claim 12, wherein a drive unit is provided in the roller main body to rotate the roller main body.

14. The mold conveyance roller unit according to claim 1, wherein a drive unit is provided in the roller main body to rotate the roller main body.

15. A system, comprising:
- a horizontal injection molding machine;
- a first mold change device extending from a first side of the horizontal injection molding machine, the first mold change device includes a first conveyance direction;
- a plurality of mold conveyance roller units mounted on the horizontal injection molding machine and/or on the first mold change device for supporting a mold, each one of the mold conveyance roller units includes:
  - a rotatable roller main body;
  - a roller support member that rotatably supports the rotatable roller main body;
  - a base member to which the roller support member is attached, the base member is fixed to the horizontal injection molding machine or to the first mold change device;
  - the rotatable roller main body and the roller support member are mounted so as to be moveable together relative to the base member in a direction perpendicular to the first conveyance direction; and
  - a resilient member disposed between the base member and the roller support member that elastically biases the roller support member in a direction away from the base member, and a pre-load is applied to the resilient member that is sufficient to prevent downward movement of the rotatable roller main body in a direction toward the base member due to the weight of the mold used with the horizontal injection molding machine and the first mold change device.

16. The system of claim 15, further comprising a second mold change device extending from a second side of the horizontal injection molding machine, the second mold change device includes a second conveyance direction that is parallel to the first conveyance direction.

17. The system of claim 15, wherein the plurality of mold conveyance roller units are mounted on the first mold change device in two rows.

18. The system of claim 15, wherein the plurality of mold conveyance roller units are mounted on the horizontal injection molding machine and on the first mold change device.

19. The system of claim 15, wherein the preload is 200 kgf.

* * * * *